(12) United States Patent
Domingo (10) Patent No.: US 11,292,984 B2
(45) Date of Patent: Apr. 5, 2022

(54) ADDITIVE COMPOSITION FOR HYDRAULIC FLUIDS OR HEAT TRANSFER FLUIDS

(71) Applicant: GlobalTech Fluids, LLC, Orlando, FL (US)

(72) Inventor: Oscar A. Domingo, Orlando, FL (US)

( * ) Notice: Subject to any disclaimer, the term of this patent is extended or adjusted under 35 U.S.C. 154(b) by 347 days.

(21) Appl. No.: 16/334,634

(22) PCT Filed: Mar. 28, 2018

(86) PCT No.: PCT/US2018/024761
§ 371 (c)(1),
(2) Date: Mar. 19, 2019

(87) PCT Pub. No.: WO2018/200115
PCT Pub. Date: Nov. 1, 2018

(65) Prior Publication Data
US 2021/0171852 A1 Jun. 10, 2021

Related U.S. Application Data

(60) Provisional application No. 62/490,250, filed on Apr. 26, 2017.

(51) Int. Cl.
*C10M 141/10* (2006.01)
*C09K 5/10* (2006.01)
(Continued)

(52) U.S. Cl.
CPC ............. *C10M 141/10* (2013.01); *C09K 5/10* (2013.01); *C10M 105/38* (2013.01);
(Continued)

(58) Field of Classification Search
CPC ............. C10M 141/10; C10M 105/38; C10M 125/10; C10M 129/34; C10M 129/42;
(Continued)

(56) References Cited

U.S. PATENT DOCUMENTS 3,532,639 A 10/1970 Hatch
5,240,631 A * 8/1993 Mascioli ................. C09K 5/20
252/74

(Continued)

FOREIGN PATENT DOCUMENTS

JP 2013204018 A 10/2013

OTHER PUBLICATIONS

Totten, G. E., & Negri, V. J., Handbook of Hydraulic Fluid Technology (2nd ed.), 2011, pp. 340-342, CRC Press/Taylor & Francis Group, Boca Raton, FL.
(Continued)

*Primary Examiner* — Cephia D Toomer
(74) *Attorney, Agent, or Firm* — Wolter Van Dyke Davis, PLLC; Robert L. Wolter (57) ABSTRACT

An additive composition for a hydraulic fluid, or a heat transfer fluid, comprises one or more phosphate esters derived from the esterification of phosphoric acid and one or more monomer glycols containing up to 18 carbon atoms, or combinations thereof. In addition, the additive composition may comprise one or more corrosion inhibitors selected from the group consisting of dicarboxylic acids, alkanolamines or combinations thereof; one or more antioxidants including selected from the group consisting of one or more organosulfur compounds, one or inorganic oxyanion salts or combinations thereof; and, one or more surfactants.

19 Claims, 4 Drawing Sheets (51) Int. Cl.

| | |
|---|---|
| *C10M 105/38* | (2006.01) |
| *C10M 125/10* | (2006.01) |
| *C10M 129/08* | (2006.01) |
| *C10M 129/34* | (2006.01) |
| *C10M 129/42* | (2006.01) |
| *C10M 133/08* | (2006.01) |
| *C10M 135/18* | (2006.01) |
| *C10M 137/04* | (2006.01) |
| *C10M 169/04* | (2006.01) |
| *C10M 173/02* | (2006.01) |
| *C10N 30/10* | (2006.01) |
| *C10N 30/12* | (2006.01) |
| *C10N 40/04* | (2006.01) |
| *C10N 40/08* | (2006.01) |

(52) U.S. Cl.
CPC ........ *C10M 125/10* (2013.01); *C10M 129/08* (2013.01); *C10M 129/34* (2013.01); *C10M 129/42* (2013.01); *C10M 133/08* (2013.01); *C10M 135/18* (2013.01); *C10M 137/04* (2013.01); *C10M 169/04* (2013.01); *C10M 173/02* (2013.01); *C10M 2201/062* (2013.01); *C10M 2207/022* (2013.01); *C10M 2207/123* (2013.01); *C10M 2207/127* (2013.01); *C10M 2207/2835* (2013.01); *C10M 2215/26* (2013.01); *C10M 2219/104* (2013.01); *C10M 2223/04* (2013.01); *C10N 2030/10* (2013.01); *C10N 2030/12* (2013.01); *C10N 2040/04* (2013.01); *C10N 2040/08* (2013.01)

(58) Field of Classification Search
CPC ............. C10M 133/08; C10M 135/18; C10M 137/04; C10M 169/04; C10M 173/02; C10M 2201/062; C10M 2207/123; C10M 2207/127; C10M 2207/2835; C10M 2215/26; C10M 2219/104; C10M 2223/04; C09K 5/10; C10N 2030/10; C10N 2030/12; C10N 2040/04; C10N 2040/08

See application file for complete search history.

(56) References Cited

U.S. PATENT DOCUMENTS

| | | | |
|---|---|---|---|
| 5,290,469 | A | 3/1994 | Turcotte et al. |
| 5,330,670 | A | 7/1994 | Turcotte et al. |
| 5,366,651 | A | 11/1994 | Maes et al. |
| 5,372,627 | A * | 12/1994 | Konzak .................. C05B 15/00 71/33 |
| 5,387,360 | A | 2/1995 | Uekusa et al. |
| 5,643,493 | A | 7/1997 | Connor et al. |
| 5,997,763 | A | 12/1999 | Pabon, Jr. et al. |
| 6,290,870 | B1 | 9/2001 | Turcotte et al. |
| 7,879,777 | B2 | 2/2011 | Tynik et al. |
| 9,096,812 | B2 | 8/2015 | Smith et al. |
| 9,534,189 | B2 | 1/2017 | Tran et al. |
| 2003/0052302 | A1 | 3/2003 | Eaton et al. |
| 2005/0096236 | A1 | 5/2005 | Le Sausse et al. |
| 2008/0048147 | A1 | 2/2008 | Eaton |
| 2008/0315152 | A1 | 12/2008 | Daly |
| 2009/0088349 | A1* | 4/2009 | Zhao .................. C10M 169/04 508/185 |
| 2014/0070134 | A1 | 3/2014 | Woyciesjes |
| 2014/0230695 | A1 | 8/2014 | Park |
| 2014/0264150 | A1 | 9/2014 | Domingo |
| 2016/0208193 | A1 | 7/2016 | Caskey, Jr. |

OTHER PUBLICATIONS

PCT/US2018/024761 International Search Report and Written Opinion, dated Jun. 11, 2018, 10 pages.

EP18791830.5 Extended Search Report, dated Dec. 4, 2020, 7 pages.

\* cited by examiner

Ref. 0:1
L=6.00mm
W=3.62mm

ADDITIVE COMPOSITION FOR HYDRAULIC FLUIDS OR HEAT TRANSFER FLUIDS

CROSS-REFERENCE TO RELATED APPLICATIONS

This patent application claims the benefit of the provisional patent application assigned 62/490,250, filed on Apr. 26, 2017, which is incorporated herein in its entirety.

FIELD OF THE INVENTION

Aspects of this invention relate generally to hydraulic fluids and heat transfer fluids that incorporate as a base component non-petroleum compounds such as vegetable oils, animal oils, glycerin, glycols, poly-glycols and/or water. More specifically, aspects of the invention relative to additive compositions for such fluids that are designed to enhance certain properties of these fluids such as lubricity and heat transfer.

BACKGROUND OF THE INVENTION

Additive packages or compositions are commonly blended with base chemical compounds or compositions to form functional fluids such as hydraulic fluids or heat transfer fluids. Typical additives may include corrosion inhibitors, which as the name implies when added to a liquid or gas, decrease the common rate of corrosion of a material, typically a metal alloy. Other additive compounds may include anti-oxidants, which inhibit the oxidation of other compounds of a chemical composition, for example, and surfactants, which are compounds that lower the surface tension between two liquids, between a liquid and a gas and between a liquid and a solid.

Hydraulic fluids and heat transfer fluids, which typically remain in constant fluid contact with metal and alloy machine components, may include the above-described chemical additives. Such fluids include a base fluid or blends of base fluids combined with additives. For example, hydraulic fluids may include base fluids such as vegetable oils, a water/glycol blend, petroleum based oils and/or phosphate esters.

Phosphate ester based hydraulic fluids have good lubricity and fire resistant properties. Their high ignition temperatures, excellent oxidation stability and very low vapor pressures make them difficult to burn, while their low heats of combustion result in self-extinguishing fluids. Although phosphate esters possess excellent oxidation stability and inherently good anti-wear properties under critical loading conditions, they suffer from somewhat inferior hydrolytic stability, low viscosity index and extreme chemical aggressiveness toward many conventional seal and coating materials. These weaknesses limit the use of phosphate esters to specialized applications where a high degree of fire resistance is required.

While currently there are no international standards describing in-soil biodegradation testing procedures, testing has been performed to evaluate soil bio-degradability and toxicity of hydraulic fluids containing mineral oil, vegetable oil, polyglycol and synthetic ester. See, *Handbook of Hydraulic Fluid Technology*, Taylor and Francis Group, LLC (2002) (pgs. 340-342). Notably, crop damage was not necessarily related to the level of the oil residues; however, although dibasic esters biodegraded rapidly, they caused a complete inhibition of seed germination. A mixture of white spirit of vegetable oil permitted seed germination, but significantly inhibited both growth rate and yield. Synthetic esters degraded more rapidly than mineral oil, but not as rapidly as vegetable oil-derived lubricant. However, even vegetable oil requires one year for extractable residues to decrease to levels comparable to the natural lipids present in soil.

SUMMARY OF THE INVENTION

The inventor of the subject invention has developed an additive composition that utilizes phosphate esters for purposes of providing lubricating and fire resistant properties, wherein the phosphate ester is provided as an additive as opposed to a base chemical compound for a functional liquid such as a hydraulic fluid or a heat transfer fluid.

According to an aspect of the invention the additive composition comprises one or more phosphate esters that are derived from the esterification of phosphoric acid and one or more monomer glycols containing up to 18 carbon atoms, or combinations thereof. In a preferred embodiment, the one more monomer glycols consists of glycols that are $C_2$ to $C_6$ monomer glycols, and most preferably include ethylene glycol, propylene glycol or 1,3 propylene glycol or combinations thereof. According to another aspect of the invention, the phosphate ester is present in an amount of about 25% to about 40% by weight of the additive composition, and preferably present in an amount of about 30% by weight of the additive composition.

Other aspects of the inventive additive composition include one or more corrosion inhibitors, one or more antioxidants and one or more surfactants. According to various aspects of the invention the one or more corrosion inhibitors are present in an amount of about 40% to about 60% by weight, the one more antioxidants are present in an amount of 50% to about 60% by weight and the one or more surfactants are added in an amount of about 0.5% to about 1% by weight of the additive composition.

Another aspect of the invention pertains to fluids, such as hydraulic fluids or heat transfer fluid (e.g. antifreeze), which include the above-described additive composition. Accordingly, aspects of the invention may encompass a hydraulic fluid that comprises a blend of about 90% by volume of glycerin and about 10% by volume of the additive composition. In such a blend the phosphate ester may be present in amount of about 3% by weight of the hydraulic fluid as compared to above described phosphate ester based hydraulic fluids, which typically have the phosphate ester present in an amount of at least 80% by weight of the hydraulic fluid.

According to aspects of the invention, the additive composition may be combined with water, glycerin or monomer glycols, preferably ethylene glycol, propylene glycol, or 1,3-propanediol, or any combinations thereof, to make a hydraulic fluid, lubricant or heat transfer fluid. In preferred embodiments, the additive composition may be present in amounts of about 5% by volume to about 20% volume with these other chemical compounds.

With respect to embodiments in which the inventive additive composition is combined with a glycerin by-product for production of hydraulic fluids or heat transfer fluids have significant ecological and economic advantages over fluids based on mineral oil, vegetable oil or synthetic esters. The refinement of a glycerin by-product is a relatively low energy production process including desalination processes; and, a refined glycerin by-product serves as a renewable source for production of hydraulic fluids and heat transfer fluids.

In addition, glycerin is almost 90% biodegraded within 28 days. To that end, the inventor has found that a fluid containing combination of the inventive additive composition and a base substance, such as a glycerin by-product, may actually have fertilizing properties and promote growth of vegetation.

DETAILED DESCRIPTION OF THE INVENTION

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise defined, all technical and scientific terms used herein are intended to have the same meaning as commonly understood in the art to which this invention pertains at the time of its filing. Although various methods and materials similar or equivalent to those described herein can be used in the practice or testing of the present invention, suitable methods and materials are described below. However, the skilled should understand that the methods and materials used and described are examples and may not be the only ones suitable for use in the invention.

Moreover, it should also be understood that as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary. Hence, where appropriate to the invention and as understood by those of skill in the art, it is proper to describe the various aspects of the invention using approximate or relative terms and terms of degree commonly employed in patent applications, such as: about, approximately, substantially, essentially, consisting essentially of, comprising, and effective amount. Unless defined otherwise, all technical and scientific terms used herein have the same meaning as commonly understood by one of ordinary skill in the art.

The term "additive" or "additive composition" as used herein means a substance or substances, including chemical compounds, or blend of substances that is added to other base compounds, base blends, or base compositions of matter. The additive composition ideally enhances, improves or creates certain properties or characteristics of the end product, composition or blend. For example, according to aspects of the invention disclosed herein the additive composition may be combined with glycerin, water, small chain glycols or combinations thereof to affect properties of the final composition or blend such as viscosity, density, pH, boiling point, freezing point, temperatures stability, anti-corrosiveness. Accordingly, aspects of the inventive additive composition may comprise one or more lubricants, one or more corrosion inhibitors, one or more antioxidants and/or one or more surfactants.

The term "lubricant" as used herein shall mean any compounds or composition or substance that minimizes friction especially between two components (e.g. metal and/or alloy components) moving relative to one another. The term "corrosion inhibitor" as used herein shall mean a substance or blend of substances that, when added to a liquid or gas, decreases the corrosion rates of a material, typically a metal or an alloy.

The term "antioxidant" as used herein shall mean a substance or blend of substances that inhibit oxidation of other substances, chemical compounds or molecules. The term "surfactant" as used herein shall refer to substances that lower the surface tension (or interfacial tension) between two liquids, between a gas and a liquid, or between a liquid and a solid.

When used to describe concentrations of formulations references to a substance being "present in an amount of, added in amount or provided in an amount of" shall mean when the inventive additive compositions is blended made the constituent substance is added in that amount, when in solution the constituent substance is in solution at that concentration.

Examples of lubricants according to aspects of the invention may include phosphate esters derived from the esterification of phosphoric acid and short chain or monomer glycols containing up to 18 carbon atoms. These may include, for example, ethylene glycol, propylene glycol, butylene glycol, pinecone, trimethylene glycol, tetramethylene glycol, pentamethylene glycol and the like. Accordingly, the additive compositions may include monoesters, diesters or triesters or combinations thereof.

In preferred embodiments esters are derived from $C_2$ to $C_6$ monomer glycols, and more preferably the additive composition may comprise phosphate esters derived from the esterification of phosphoric acid and ethylene glycol, propylene glycol (1,2-propanediol), 1,3-propanediol or combinations thereof.

The additive composition according to aspects of the invention include phosphate esters derived from the esterification of phosphoric ester and ethylene glycol ester or propylene glycol or 1,3 propanediol, or combinations thereof, wherein these esters are added or included in amount of about 10% to 50% by weight of the composition, and preferably about 30% by weight of the additive composition.

According to various aspects of the invention, the additive may comprise one or more corrosion inhibitors selected from the group of dicarboxylic acids or alkanolamines or combinations thereof. Dicarboxylic acids may include oxalic acid, malonic acid, succinic acid, glutaric acid, adipic acid, pimelic acid, suberic acid, azelaic acid, sebacic acid undecanededioic acid, dodecanedioic acid, brassylic acid or thapsic acid or combinations thereof. In a preferred embodiment, the dicarboxylic acids are selected from the group consisting of succinic acid or sebacic acid or combinations thereof.

In addition, or alternatively, the corrosion inhibitors may comprise alkanolamines such as $C_1$ to $C_6$ alkanolamines such as methanolamines, ethanolamines, propanolamines, heptaminol and others such as aminomethyl propanol, isoetarine, sphingosine, dimethylethanolamine, and N-methylethanolamine or combinations thereof. In a preferred embodiment the alkanolamines may comprise a methanolamine or an ethanolamine or combinations thereof.

The one or more corrosion inhibitors may be present in the additive composition in an amount that is about 40% to 60% by weight of the additive composition and preferably closer to 60% by weight of the additive composition.

The additive composition according to aspects of the invention may comprise one or more antioxidants to prevent the oxidation of other components of a blend of the additive composition with glycerin, such as a glycerin by-product derived from bio-diesel manufacturing processes and/or transesterification reactions involving triglycerides. The antioxidants may be incorporated to stabilize the glycerin by-product to form a hydraulic fluid composition.

The antioxidants, for example, may comprise organosulfur compounds such as thiols, thiazoles containing one or more R—SH functional groups, such as 2-mercaptobenzothiazol or other such compounds or other aromatic thiols, aromatic thiazoles, disulfides and polysulfides including R—S—S—R group including a sulfur to sulfur covalent bond, or combinations thereof.

In addition, or alternatively, the one or more antioxidants may comprise oxyanion containing compounds such as inorganic salts containing oxyanions. According to aspects of the invention, the inventive additive composition may comprise molybdate oxyanions salts such as sodium molybdate, sodium dimolybdate, hydrated diammonium dimolybdate, ethylenediamine molybdate, potassium molybdate, anilinium molybdate, ammonium molybdate and trimethylammonium molybdate or combinations thereof.

According to aspects of the invention, the one or more antioxidants is present in amount of about 2% to about 10% by weight of the additive composition, and preferably present in an amount of 6.0% by weight of the composition.

Example 1

A first additive composition according to aspects of the invention was blended according to the following formulation:

| G10 FORMULA | |
|---|---|
| Components | Formula (% wt) |
| Methylene glycol | 6.00 |
| Ethylene glycol phosphate ester | 30.00 |
| 3-Ethanolamine | 50.00 |

-continued

| G10 FORMULA | |
|---|---|
| Components | Formula (% wt) |
| Ethanolamine | 6.00 |
| 2-Mercaptobenzothiazol | 2.50 |
| Sebacic acid | 4.00 |
| Succinic acid | 1.00 |
| DBP 25 | 0.50 |
| TOTAL | 100.00 |

Example 2

A second additive composition according to aspects of the invention was blended according to the following formulation:

| HC10 FORMULA | |
|---|---|
| Components | Formula (% wt) |
| 40% Sodium Molybdate/60% $H_2O$ | 6.00 |
| Ethylene glycol phosphate ester | 30.00 |
| 3-Ethanolamine | 50.00 |
| Ethanolamine | 8.00 |
| 2-Mercaptbenzothiazol | 3.50 |
| Sebacic acid | 0.00 |
| Succinic acid | 2.00 |
| DBP 25 | 0.50 |
| TOTAL | 100.00 |

Testing

Testing was performed on the formulations set forth above in Examples 1 and 2. More specifically, friction testing was performed using an LWT-2 lubricating abrasion tester manufactured and sold by Chongqing TOP Oil Purifier Co., LTD. Such a device utilizes a weighted lever arm and rotating abrasion wheel relative to a test bearing to generate an output of power and temperature. That is a power reading is displayed representing an amount of power necessary to rotate the abrasion wheel. In addition, a temperature of the friction point or friction area at which the abrasion wheel contacts the test bearing is taken and displayed. Weights are added to an end of the lever arm in 100 kg increments to increase friction between the test bearing and the abrasion wheel. Such devices are well known to those skilled in the art for performing abrasion/friction testing.

The reference oil used in the testing was an ISO 46 vegetable based oil sold by Mfg. Renewable Lubricants, Inc. under the brand name BIO-ULTIMAX™. In addition to the reference oil being tested, both Example 1 (also referred to as the "G10" formula) and Example 2 (also referred to as the "HC10" formula) were tested. A third formulation (also referred to as "G10+M) was also tested and included the formulation of Example 1 with the exception of replacing the 6.0% by weight methylene glycol with 6.0% by weight of sodium molybdate in water (40% $Na_2MoO_4$/60% $H_2O$).

Thus the HC10 formulation and G10+M formulation were similar in the sense that both included 6.0% by weight of the aqueous sodium molybdate; however, the HC10 formulation did not include sebacic acid, and the relative concentrations of the methanolamine, 2-mercaptobenzothiazol and succinic acid were different. The G10 formulation had a pH of 7.8; the G10+M formulation had a pH of 7.82 and the HC10 formulation had a pH of 8.2.

Figure 1:
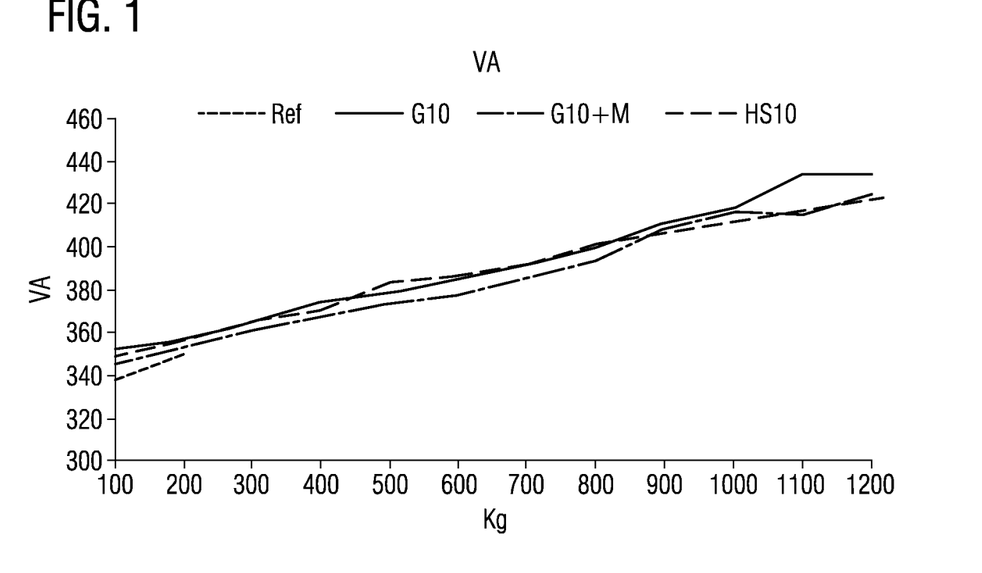
FIG. 1 is a graph showing friction test results relative to aspects of the inventive additive composition.

The abrasion/friction test results regarding "power input" (volts amps (current)) are shown with respect to the below Table I and the graph shown in FIG. 1. Power readings were recorded beginning with the addition of a 100 kg weight and continued until a maximum weight of 1200 kg was added, unless the motor to the device had to be deactivated due to loss of lubrication of the tested formulation.

As shown, the reference oil had a stop weight of 200 kg. That is the device motor had to be deactivated after the addition of 200 kg to avoid damage to the device motor. The "power input" for the three remaining increased generally linearly as weight was added to the device; however, the test results did not show a significant difference in this tested parameter of the three formulations, G10, G10+M, and HC10.

TABLE I

| Weight in kg | Ref | VA G10 | G10 + M | HC10 |
|---|---|---|---|---|
| 100 | 337.96 | 352.52 | 345.42 | 349.27 |
| 200 | 349.84 | 356.11 | 353.73 | 356.7 |
| 300 | | 365.06 | 360.85 | 365.22 |
| 400 | | 374.6 | 367.04 | 370.34 |
| 500 | | 378.6 | 373.28 | 383.18 |
| 600 | | 385.02 | 377.38 | 386.75 |
| 700 | | 391.51 | 385.66 | 392.04 |
| 800 | | 399.17 | 394.12 | 401.2 |
| 900 | | 411.05 | 408.28 | 406.8 |
| 1000 | | 417.97 | 416.18 | 411.88 |
| 1100 | | 434.16 | 415 | 416.82 |
| 1200 | | 434.89 | 424.08 | 422.57 |
| Ph= | | 7.8 | 7.82 | 8.2 |

Figure 2:
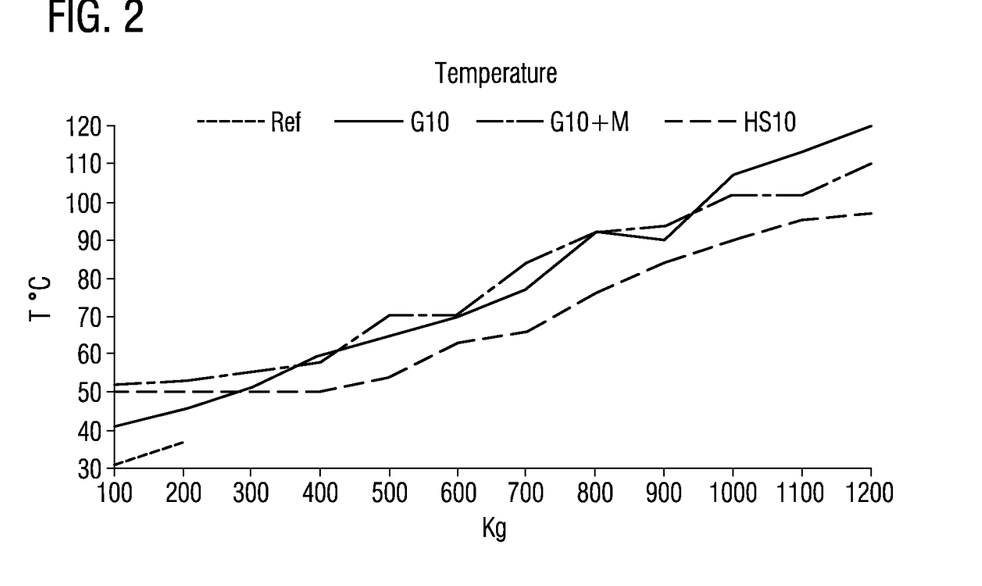
FIG. 2 is a graph showing friction test results relative to aspects of the inventive additive composition.

The abrasion/friction test results with respect to temperature of a tested formulation are shown in reference to the below Table II and the graph of FIG. 2. As shown, beginning with a weight of 300 kg, the HC10 formulation had consistently lower temperatures than the G10 and G10+M formulations through the stop weight of 1200 kg, with a maximum temperature of 97° C. This lower temperature is a clear indication of the HC10 formula maintaining lubricity properties.

TABLE II

Temperature ° C.

| | Ref | G10 | G10 + M | HC10 |
|---|---|---|---|---|
| 100 | 31 | 41 | 52 | 50 |
| 200 | 36.6 | 45.4 | 53 | 50 |
| 300 | | 51 | 55 | 50 |
| 400 | | 59.8 | 58 | 50 |
| 500 | | 65 | 70 | 54 |
| 600 | | 70 | 70 | 63 |
| 700 | | 77 | 84 | 66 |
| 800 | | 92 | 92 | 76 |
| 900 | | 90 | 93.6 | 84 |
| 1000 | | 107 | 102 | 90 |
| 1100 | | 113 | 102 | 95 |
| 1200 | | 120 | 110 | 97 |
| Ph= | | 7.8 | 7.82 | 8.2 |

Figure 3:
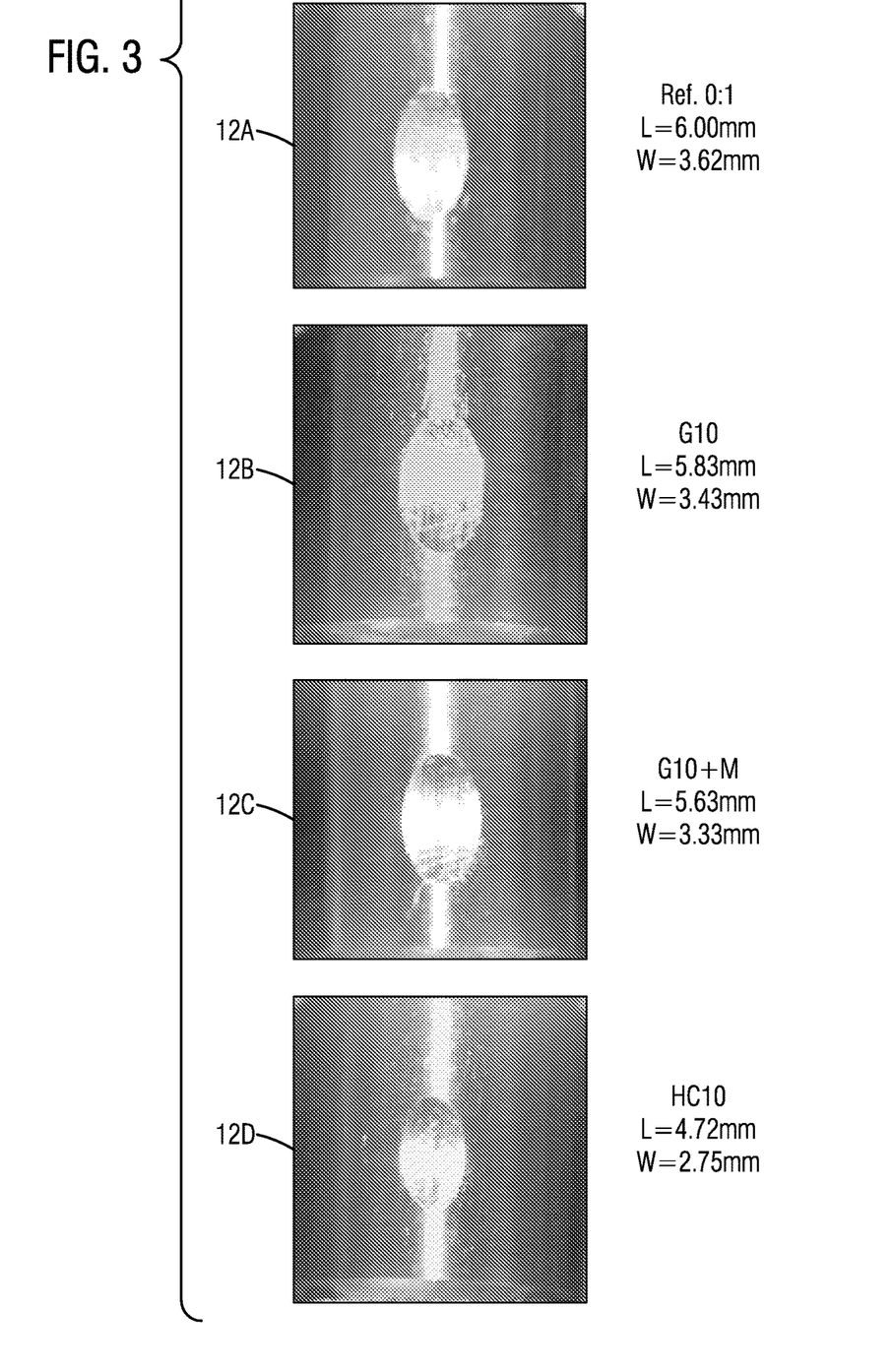
FIG. 3 includes images of test bearing used in the above-referenced friction analysis testing.

In reference to FIG. 3, photographs of the metal probes relative to each of the tested formulation taken to measure the wear areas 12A, 12B, 12C, 12D on each metal probe corresponding to each formulation. As shown and as expected based on the temperature measurements, the probe corresponding to the HC10 formulation showed the least amount of wear at the area 12D.

The inventive additive composition, according to aspects of the invention, was blended with water and glycerin according to the formulations of the below Table III. More specifically, 10% by volume of HC10 was blended with 90.0% by volume of glycerin. This HC10/Glycerin blend was then mixed with water according to volume/volume percentages as provided below. In addition, kinetic viscosity was measured for each formulation at 40° C. using a known glass capillary method.

TABLE III

BLEND GLYCERIN-HC10 (HC)/H2O

| % v/v (HC-W) | # ISO | ISO RANGE | VISCOSITY @ 40° C. | WEAR | Industrial use |
|---|---|---|---|---|---|
| 78/22 | 15 | 13.5-16.5 | 16.48 cst | Moderate | Special application |
| 82/18 | 22 | 19.8-24.2 | 23.5 cst | Moderate | Special application |
| 85/15 | 32 | 28.8-35.2 | 32.65 cst | Low | Transmission fluid |
| 88/12 | 46 | 41.4-50.6 | 43.65 cst | Low | Hydraulic fluid |
| 94/6 | 68 | 61.2-74.8 | 73.22 cst | Low | Hydraulic fluid |
| 97/3 | 100 | 90-110 | 96.72 cst | Low | Special application |
| 50/50 | n/a | n/a | n/a | n/a | coolant |

With respect to each of the above formulations, and any formulation disclosed herein, glycerin preferably refers to a glycerin that is a by-product of bio-diesel manufacturing processes and transesterification reactions involving triglycerides. Crude glycerin produced from bio-diesel process typically has about 80% by weight glycerol, 0.8% by weight of fatty acids, at most about 0.5% by weight of methanol, and about 6.5% by weight of NaCl. Of course, these concentrations may vary depending on the grade and source of glycerin. The crude glycerin preferably undergoes electrodialysis desalination processes to reduce the salt content to below 100 ppm.

Embodiments of the inventive additive composition may be combined with glycerin, water or one or more monomer glycols, or combinations thereof to produce various types of fluids including lubricants, heat transfer fluids, automotive fluids, metalworking fluids and the like. In terms of monomer glycols, the additive composition is preferably combined with $C_2$ to $C_6$ monomer glycols, and most preferably ethylene glycol, propylene glycol, or 1,3-propanediol or combinations thereof. In such fluids the additive composition is blended with the other substances or chemical in an amount that is 5% by volume to 20% wt of the final fluid composition.

The below Table IV provides different formulations of the inventive additive composition according to different applications of the final fluid product.

| Suggested Application | | Water (%) | EG (%) | Propylene Glycol (%) | PDO (%) | Glycerin (%) | HC10 (%) |
|---|---|---|---|---|---|---|---|
| HYDRAULIC FLUID | Low-cost ISO 46 | 12 | | | | 80 | 8 |
| | Environmental sensitive ISO 15 | | | 93 | | | 7 |
| | Cold weather ISO 15 | 30 | | | | 63 | 7 |
| | Fire resistant | 40 | 55 | | | | 5 |
| | Food processing | | | 47 | | 47 | 6 |
| HEAT TRANSFER FLUID | Low heat degradation | | | | 95 | | 5 |
| | AC fluid | 30 | 65 | | | | 5 |
| | Solar heating | 30 | | | | 66 | 4 |
| | AC compressor lubricant | | | 93 | | | 7 |
| AUTOMOTIVE FLUIDS | Coolant | 50 | 45 | | | | 5 |
| | Nontoxic coolant | 50 | | 45 | | | 5 |
| | Low cost coolant | 50 | | | | 45 | 5 |
| | Brake fluid | | | 95 | | | 5 |
| | Transmission fluid | 30 | | | | 63 | 7 |
| | Gear lubricant | | | | | 90 | 10 |
| METALWORKING | Cutting fluid | 10 | | | | 70 | 20 |
| | Corrosion protection | | 10 | | | 75 | 15 |
| | Metalworking additive | | | | | 80 | 20 |
| INDUSTRIAL LUBRICANTS | Heat resistant | | | | 30 | 63 | 7 |
| | Penetrating | 10 | 83 | | | | 7 |
| | Multipurpose | | 20 | | | 73 | 7 |

Electrochemical chemical corrosion testing was performed on formulations consistent with the formulations set for in the above Table IV to determined corrosion velocity of aluminum and iron. More specifically, a fluid sample including 10% by volume of the HC10 of Table II and 90% by volume of glycerin by product was diluted with water including 70% by volume of HC10/Glycerin to 30% by volume of water. The diluted sample underwent electrochemical corrosion testing using an iron electrode to determine the corrosion velocity of aluminum in the sample fluid. The corrosion testing was performed according to ASTM D1384 standard test method for corrosion testing using an Metrohm Autolab PGSTAT30 potentiostat-galvanostat instrument with a recirculating cell. The testing was performed with the solution at 78° C.

Figure 4:
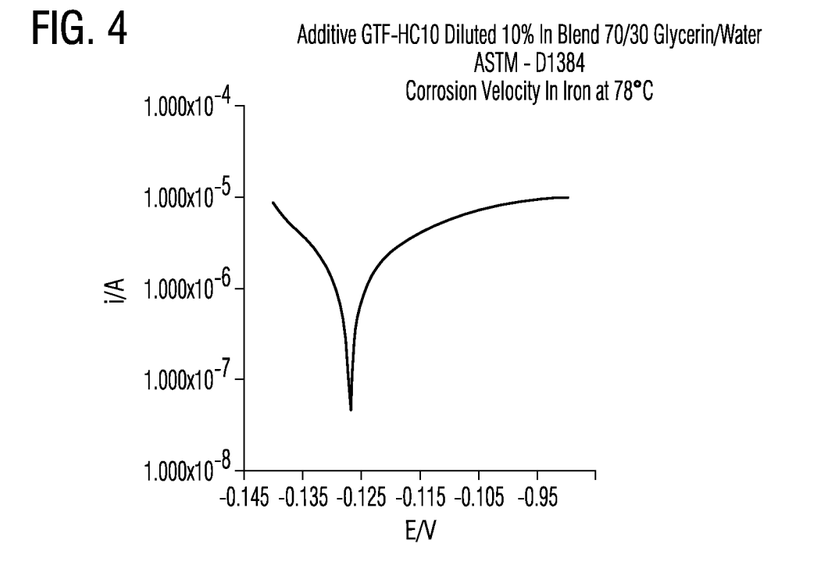
FIG. 4 is a graph of test results from an iron corrosion rate test of a test solution including the inventive composition and according testing standard ASTM D-1384.
Figure 5:
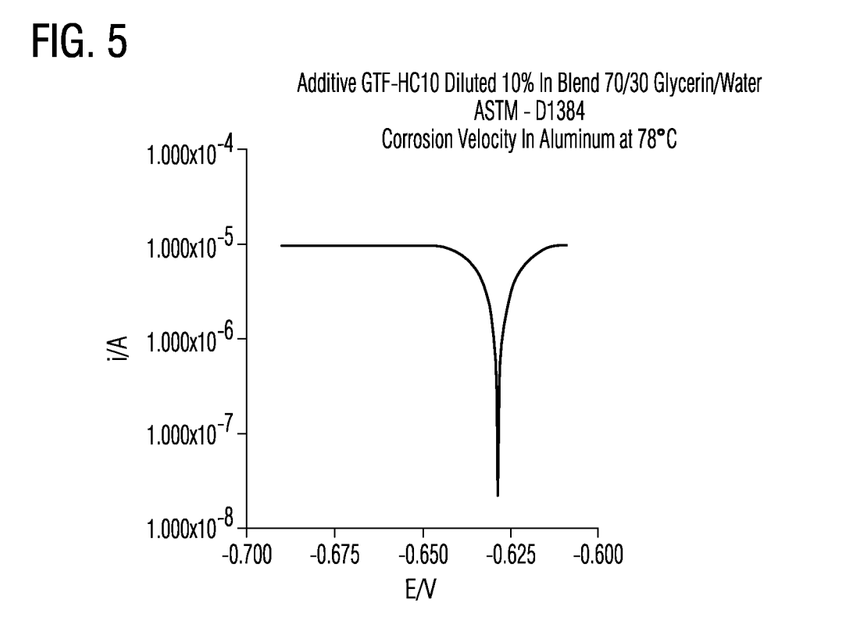
FIG. 5 is a graph of test results from an aluminum corrosion rate test of a test solution including the inventive composition and according testing standard ASTM D-1384.

In addition, the corrosion rate was evaluated by linear voltammetry, a method in which the potential applied to the working electrode is varied linearly in time, in this case adding and subtracting 25 mV at open circuit potential. The slope of this ramp has units of volts per unit time, and is generally called the scan rate of the experiment. Oxidation or reduction of species is registered as a peak or trough in the current signal at the potential at which the species begins to be oxidized or reduced. The rate is determined by a Tafel calculation which gives access to the corrosion current regularly present at the surface of the metal which is in contact with the coolant sample. The corrosion is expressed in loss of metal thickness per year (mm/year). The test results are shown in the graph of FIG. 4, and the calculated corrosion velocity of 0.025 mm/year In addition, a diluted sample according to the above vol/vol concentrations underwent the same electrochemical corrosion testing using an aluminum electrode to determine the corrosion velocity of iron in the sample fluid. The test results are shown in the graph of FIG. 5, and the calculated corrosion velocity of 0.078 mm/year.

The above-referenced test results for corrosion rates of a fluid containing the inventive additive composition are lower than an expected corrosion rate of a heat transfer pipe in untreated water. A typical corrosion rate of a heat exchanger tube in industrial cooling untreated water may be 40-50 mils per year (1.016 1.27 mm/year), which can be reduced to less than 5 mil/year (0.127 mm/year) with the use of a corrosion inhibitor.

Figure 6:
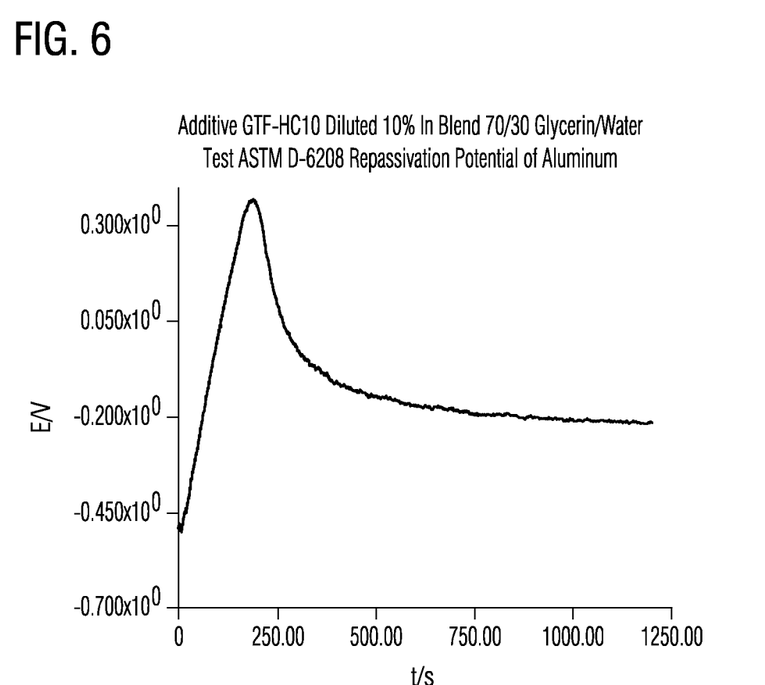
FIG. 6 is a graph of test results from an aluminum repassivation test of a test solution including the inventive composition and according testing standard ASTM D-6208.

With respect to FIG. 6, test results are shown for test method ASTM D6208 for repassivation potential of aluminum by galvanostatic measurement at room temperature. That is, a solution according to the above 70% vol./30% vol. HC10-Glycerin/Water was tested. The same potentiostat-galvanostat test instrument was used for this test. As shown the solution, in connection with aluminum, had a maximum break potential, $E_B$, of 368 mV and an initial break potential, $E_G$, of −212 mV. By way of comparison, Ford Motor Company published an engineering specification for a passenger car and light truck coolant including organic additive technology combined with water. The OAT includes monoethylene glycol and OAT corrosion inhibitors. The coolant includes the concentrate mixed 50/50 with water. The potential pitting, or break potential, $E_G$, was greater than −400 mV, according to galvanostatic testing.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. An additive composition for a hydraulic fluid, or a heat transfer fluid, comprising:
   one or more phosphate esters derived from the esterification of phosphoric acid and one or more monomer glycols wherein the one or more monomer glycols is selected from the group consisting of glycols that are $C_2$ to $C_6$ monomer glycols and the one or more phosphate esters is provided in an amount of about 30% to about 40% by weight of the additive composition;
   one or more corrosion inhibitors selected from the group consisting of dicarboxylic acids, alkanolamines or combinations thereof and the one or more corrosion inhibitors is provided in an amount of about 40% to about 60% by weight of the additive composition;
   one or more antioxidants selected from the group consisting of one or more organosulfur compounds, one or more oxyanion salts or combinations thereof, and the one or more antioxidants are provided in an amount of 50% to about 60% by weight of the additive composition;
   one or more surfactants and the one or more surfactants are provided in an amount of about 0.5% to about 1% by weight of the additive composition; and,
   wherein the one or more phosphate esters, corrosion inhibitors, antioxidants and surfactants are blended to form the additive composition.

2. The additive composition of claim 1, wherein the one more monomer glycols is selected from the group consisting of ethylene glycol, propylene glycol and 1,3 propylene glycol or combinations thereof.

3. The additive composition of 1, wherein in the one or more organosulfur compounds are selected from the group consisting of aromatic thiols, thiazoles, disulfides and polysulfides.

4. The additive composition of 3, wherein the organosulfur is 2-mercaptobenzothiazol.

5. The additive composition of claim 1, wherein the one or more oxyanion salts are molybdate salts selected from the group consisting of sodium molybdate, sodium dimolybdate, hydrated diammonium dimolybdate, ethylenediamine molybdate, potassium molybdate, anilinium molybdate, ammonium molybdate and trimethylammonium molybdate or combinations thereof.

6. A hydraulic fluid or heat transfer fluid comprising the additive composition of claim 1, wherein the additive composition is blended with a glycerin by-product of bio-diesel manufacturing processes and transesterification reactions involving triglycerides.

7. The hydraulic fluid or heat transfer fluid of claim 6, wherein the additive composition is blended with the glycerin by-product including about 5% to about 20% by volume of the additive composition and about 80% to about 90% by volume of the glycerin by-product.

8. The hydraulic fluid or heat transfer fluid of claim 6, wherein the additive composition is blended with the glycerin including about 10% by volume of the additive composition and about 90% by volume of the glycerin by-product.

9. The hydraulic fluid or heat transfer fluid of claim 7, comprising about 70% by volume of the blend of the additive composition and glycerin by-product and about 30% by volume of water.

10. An additive composition for a hydraulic fluid, or a heat transfer fluid, consisting of:
    one or more phosphate esters derived from the esterification of phosphoric acid and one or more monomer glycols including $C_2$ to $C_6$ monomer glycols;
    one or more dicarboxylic acids;
    one or more alkanolamines;
    one or more organosulfur compounds;
    one or more oxyanion salts; and,
    one or more surfactants.

11. The additive composition of claim 10, wherein the one or more phosphate esters are provided in an amount of about 30% to about 40% by weight of the additive composition.

12. The additive composition of claim 10, wherein the one or more dicarboxylic acids are provided in an amount of about 1% to about 7% by weight of the additive composition.

13. The additive composition of claim 12, wherein the one or more dicarboxylic acids are selected from the group consisting of oxalic acid, malonic acid, succinic acid, glutaric acid, adipic acid, pimelic acid, suberic acid, azelaic acid, sebacic acid, undecanedioic acid, dodecanedioic acid, brassylic acid or thapsic acid or combinations thereof.

14. The additive composition of claim 10, wherein the one or more alkanolamines are provided in an amount of about 50% to about 60% by weight of the additive compositions.

15. The additive composition of claim 14, wherein the one or more alkanolamines are selected from the group consisting of $C_1$ to $C_6$ alkanolamines.

16. The additive composition of claim 10, wherein the one or more organosulfur compounds are provided in an amount of about 2.0% to about 4.0% by weight of the additive compositions.

17. The additive composition of claim 16, wherein the one or more organosulfur compounds are selected from the group of aromatic thiols or aromatic thiazoles.

18. The additive composition of claim 10, wherein the one or more oxyanion salts are provided in an amount of about 5.0% to about 7.0% by weight of the additive compositions.

19. The additive composition of claim 18, wherein the one or more oxyanion salts are selected from the group consisting of molybdate oxyanions comprising sodium dimolybdate, hydrated diammonium dimolybdate, ethylenediamine molybdate, potassium molybdate, anilinium molybdate, ammonium molybdate and trimethylammonium molybdate or combinations thereof.

\* \* \* \* \*